Patented Apr. 28, 1925.

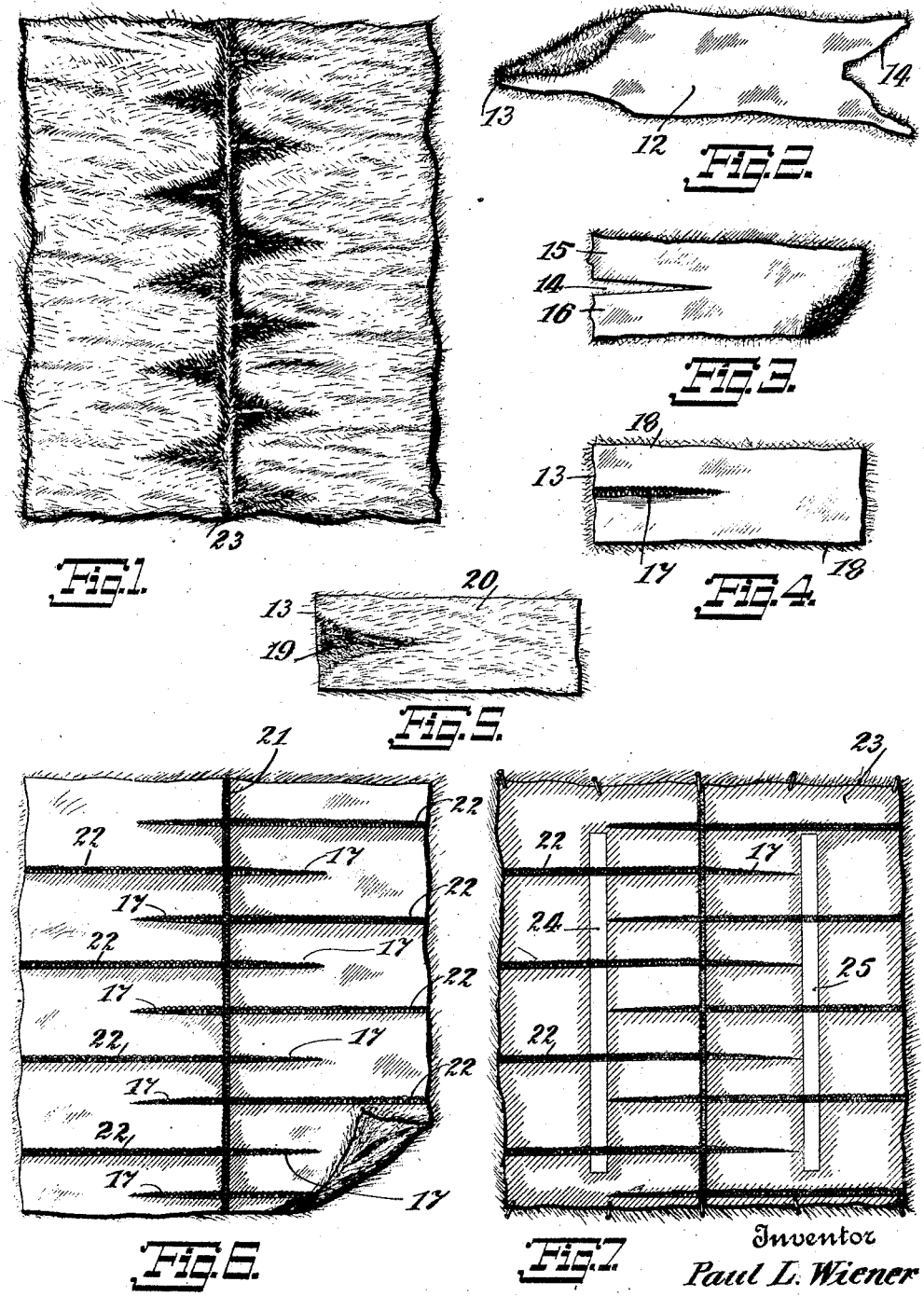

1,535,387

UNITED STATES PATENT OFFICE.

PAUL L. WIENER, OF NEW YORK, N. Y.

SKIN.

Application filed September 2, 1922. Serial No. 585,864.

*To all whom it may concern:*

Be it known that I, PAUL L. WIENER, a citizen of the United States, and a resident of the city, county, and State of New York, have invented certain new and useful Improvements in Skins, of which the following is a specification.

My present invention relates generally to skins of animals, and more particularly to the manner of treating certain portions thereof and to the product resulting from such treatment.

The skin which is found on the underside of animals such as squirrels have proven to be of slight value hitherto because of its character and size.

Among the more important objects of my invention therefore is the manner of so treating this portion of the skin of an animal that not only is its appearance as well as its value materially enhanced, but that it lends itself to assemblage to form larger skins or plates.

For the purpose of attaining these objects as well as such other objects as may appear or be pointed out hereinafter, I have shown the manner of my treatment in the drawings wherein—

Figure 1 is intended to illustrate the looks of the completed plate;

Figure 2 illustrates the first step in the treatment of each skin;

Figure 3 illustrates the second step in such treatment;

Figure 4 illustrates the third step in such treatment;

Figure 5 illustrates the appearance of the fur of the skin so treated;

Figure 6 illustrates the appearance of the back of the assembled plate; and

Figure 7 is intended to illustrate the manner of treating this back.

In handling animals, such as squirrels, for their fur, there is generally obtained the skin of what is known as the "belly" part of the animal. This portion of the skin has hitherto proven of small value not only because of its small size and consequent difficulty in handling, but because of the fact that the plate or fur piece obtained upon the assemblage of any number of these skins does not prove to be attractive in appearance.

Among the reasons for this absence of attractiveness in the fur piece are the lack of lustre or of contrasting lustres between different parts of the skin and the fact that the back of the skin proper does not form an efficient background for the fur forming hairs so as to bring out the beauty of these hairs effectively.

The "belly" skin secured from a squirrel is generally one to two inches in width and in the neighborhood of six inches in length, and generally extremely irregular in outline and in my treatment of the piece, I first trim it around to give the piece a more or less regular outline, the pieces being made generally of uniform dimensions, trimming and patching being indulged in where necessary.

Upon viewing Fig. 2, it will be observed that I here show a "belly" skin 12. Before being trimmed around, as described above, I cut away from the rump end 13 thereof, a portion to provide the triangular cut out 14, the purpose of which will more fully appear hereinafter. It will, of course, be understood, that while I have described the trimming operation as following the cutting out, to provide the cut out 14, these steps may be arranged in any desired or preferred sequence.

Fig. 3 is intended to show the piece fully treated, as above set forth, with the edges 15 and 16 forming the triangular cut out 14, forced together into juxtaposition in preparation for the next step in which these edges 15 and 16 are formed, as by sewing to form the seam 17 extending inwardly from the rump edge 13 of the skin, and approximately centrally between the side edges 18 thereof, all as clearly shown in Fig. 4 of the drawings.

The rump end of a skin before being treated as in Figs. 3 and 4 is generally of an outwardly flaring character. By providing the cut away 14 and then uniting the edges 15 and 16 thereof, as shown in Fig. 4, I have, in a novel manner, given this end of the skin the desired rectangular conformation, which permits of the ready assemblage of a number of them into a plate.

As will be understood by those skilled in this art, by cutting away as shown at 14 in Fig. 3 and joining as shown at 17 in Fig. 4, I attain the effect on the fur side of the skin, which I have attempted to illustrate at 19 in Fig. 5. This effect results from the fact that while the adjacent hairs of the skin run generally in the same direction, the provision of the seam 17, formed as described, causes the hairs on opposite sides thereof to be at an angle to each other, thus obtaining a contrasting effect, not present in the natural skin.

The pieces of skin thus formed and indicated generally by the reference character 20, are then united, rump ends 13 to rump ends 13, as clearly shown in Figs. 6 and 7, by the longitudinal seam 21 and side edge to side edge by the lateral seams 22. In this manner, I produce a plate or piece of fur which is characterized by a lengthwise band 23 (see Fig. 1) of contrasting hairs, the effect of which is further enhanced by the variation in width of this band 23 due to the associated effect of the seams 17 and 21. It will be understood, of course, that while I show in Figs. 6 and 7, the seams 17 and 22 as forming continuations of each other, this is not essential, as the seams can be irregularly positioned relatively to each other.

I still further enhance the general appearance of the skin by treating the exposed part 23 of the back of the fur or the skin proper with a pigment, preferably black in color. The effect of this skin 23 as a background for the hairs is very much enhanced. I have further found that by skipping longitudinal bands of the skin as those indicated at 24 and 25 in Fig. 7, a contrasting action of the skin 23 as a background for the hairs is produced, with the consequent improvement in the appearance of the fur piece.

What I desire to claim is:

The method of forming plates from skins which includes the steps of removing a portion from each skin at the rump end and intermediate opposite edges thereof to form a slot, joining the walls of said slot and then joining the skins rump end to rump end to form the plate.

Signed this 16th day of August, 1922.

PAUL L. WIENER.